Figure 9:
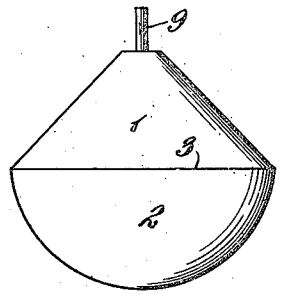

F. T. ROBERTS.
METHOD OF MAKING HOLLOW RUBBER ARTICLES.
APPLICATION FILED OCT. 26, 1917.
1,388,123.
Patented Aug. 16, 1921.
3 SHEETS—SHEET 1.
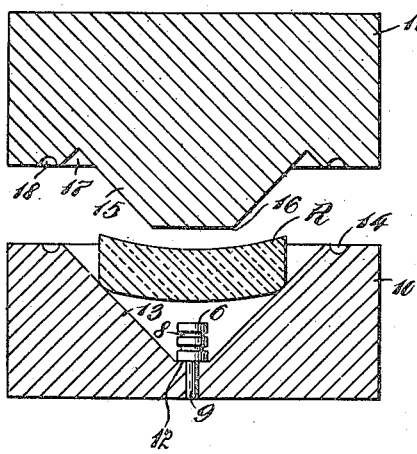
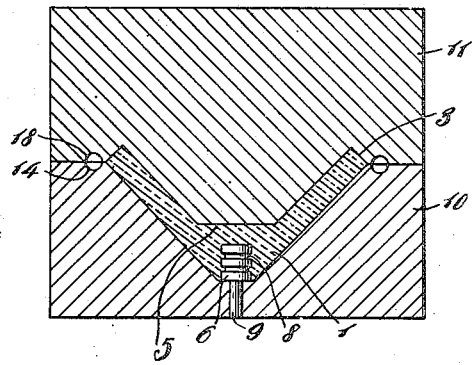
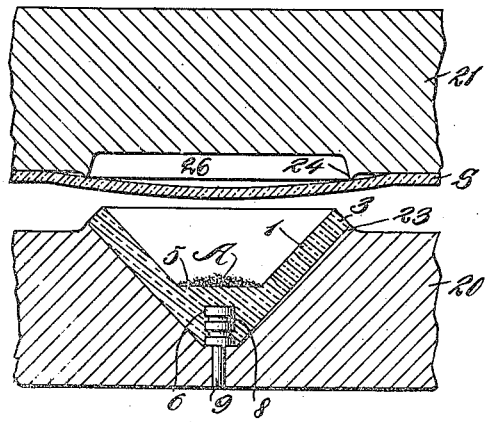
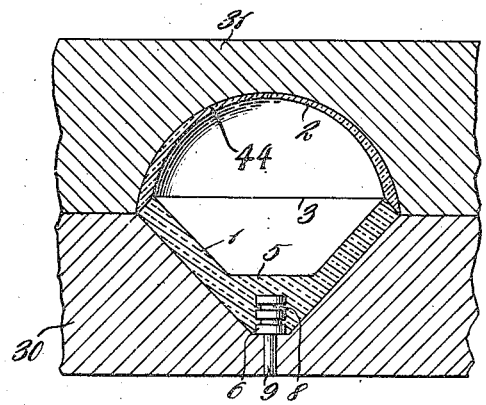
INVENTOR,
Fred Thomas Roberts,
BY Baker & Macklin
ATTYS F. T. ROBERTS.
METHOD OF MAKING HOLLOW RUBBER ARTICLES.
APPLICATION FILED OCT. 26, 1917.
1,388,123.
Patented Aug. 16, 1921.
3 SHEETS—SHEET 2.
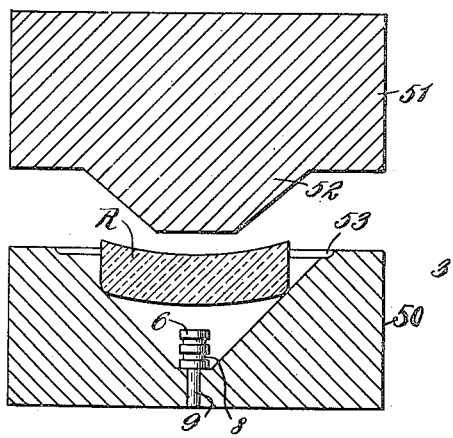
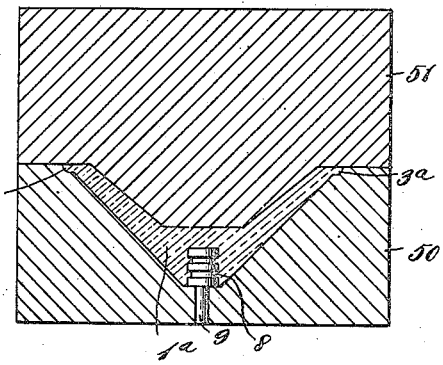
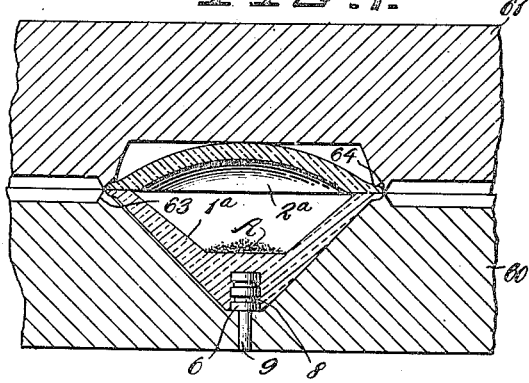
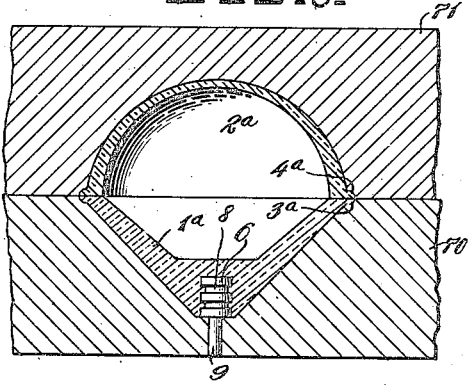

F. T. ROBERTS.
METHOD OF MAKING HOLLOW RUBBER ARTICLES.
APPLICATION FILED OCT. 26, 1917.

1,388,123.

Patented Aug. 16, 1921.
3 SHEETS—SHEET 3.

INVENTOR,
Fred Thomas Roberts,
BY Baker & Macklin,
ATTYS

UNITED STATES PATENT OFFICE.

FRED THOMAS ROBERTS, OF CLEVELAND, OHIO, ASSIGNOR, BY MESNE ASSIGNMENTS, TO PARAMOUNT RUBBER CONSOLIDATED, INC., OF PHILADELPHIA, PENNSYLVANIA, A CORPORATION OF DELAWARE.

METHOD OF MAKING HOLLOW RUBBER ARTICLES.

1,388,123.     Specification of Letters Patent.     Patented Aug. 16, 1921.

Application filed October 26, 1917. Serial No. 198,620.

*To all whom it may concern:*

Be it known that I, FRED THOMAS ROBERTS, a citizen of the United States, residing at 1105 Lakeview road, Cleveland, in the county of Cuyahoga and State of Ohio, have invented a certain new and useful Improvement in Methods of Making Hollow Rubber Articles, of which the following is a full, clear, and exact description, reference being had to the accompanying drawings.

This invention relates to hollow rubber articles of such character that it is desirable to have one part of the article of different kind of rubber from another part; for instance, where one part should be comparatively stiff and another part comparatively flexible, or where a cheaper grade of rubber may be used in one part than another. The invention is concerned with the process of making such article, wherein different kinds of rubber are connected by a vulcanized seam.

As illustrative of my invention, I may cite the case of valve balls, or flush tank bulbs, which are employed to seat over and within a round orifice in to which they are forced by water pressure. The tendency of the water pressure and the suction in the discharge pipe is to draw the ball tightly to its seat, with the liability of weakening the ball or producing uneven wear and leakage. If the ball as a whole is very stiff it will not seat accurately; if it is all very flexible it will not withstand the desired wear; but a very satisfactory result can be obtained by making the lower or seating portion of the ball of soft flexible rubber and the upper portion of a comparatively stiff grade of rubber, which may also be cheaper. My invention includes the process of forming the seam where the two grades of rubber directly join.

My invention is hereinafter more fully described, in connection with valve balls of somewhat different forms, which are illustrated in the drawings. The essential characteristics of the invention are summarized in the claims.

In the drawings, Figures 1 to 4 inclusive illustrate the making of a valve ball with a beveled seam. Fig. 1 is a cross section of a two part mold for forming the comparatively stiff portion of the article, which in this case is the upper portion of the valve ball, this view showing the mold members separated. Fig. 2 is a cross section of the same mold members after they have been brought together to form this portion of the article. Fig. 3 is a cross section of a second mold to which the article is transferred from the mold of Fig. 2 and in which a soft rubber portion is sealed to the comparatively stiff portion. Fig. 4 is a cross section of a third mold for vulcanizing this article.

Figs. 5, 6, 7 and 8 are views similar to Figs. 1, 2, 3 and 4 respectively, but showing molds for manufacturing valve balls having butt seams,—Fig. 7, however, showing the mold members brought together instead of separated, as in Fig. 3.

Figure 10:
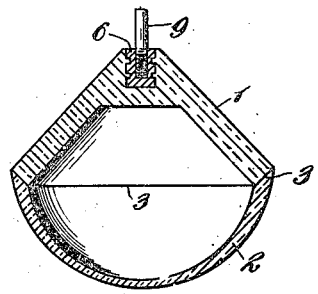
Figure 11:
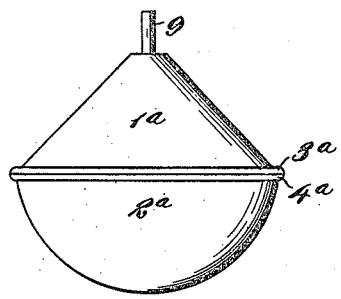
Figure 12:
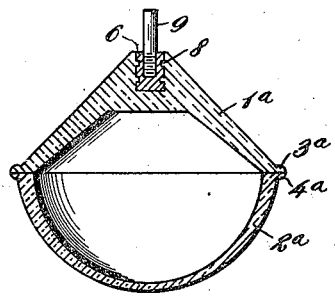
Figure 13:
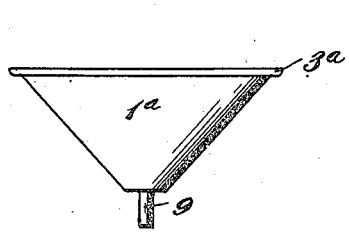
Figure 14:
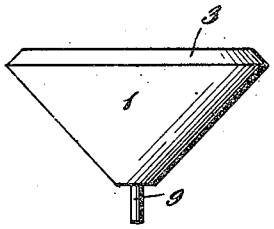
Figure 15:
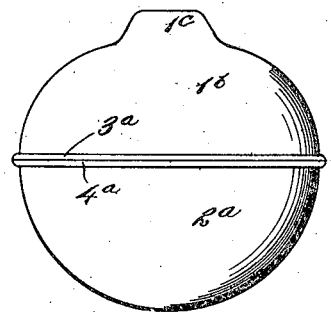
Figure 16:
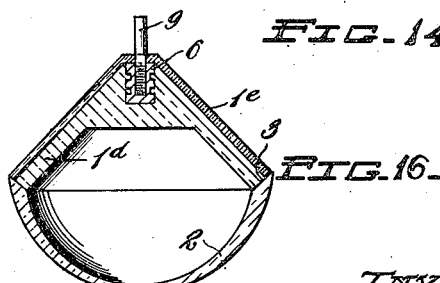

Fig. 9 is a side elevation, and Fig. 10 is a vertical section, of the valve ball with a beveled seam produced by the apparatus of Figs. 1 to 4. Figs. 11 and 12 are respectively a side elevation and a vertical section of a valve ball having a butt seam produced by the apparatus of Figs. 5 to 8. Fig. 13 is a side elevation of the comparatively stiff portion of the valve ball with the butt seam. Fig. 14 is a side elevation of the corresponding portion of the valve ball with the beveled seam. Fig. 15 is a side elevation of a valve ball having a butt seam, but having its comparatively stiff portion of different shape from that shown in the other views. Fig. 16 is a vertical section of a valve ball similar to that shown in Fig. 10 but having a rubber veneer over the main body of the stiff portion.

Referring first to Figs. 1 to 4 inclusive, and Figs. 9, 10 and 14, the comparatively stiff portion of the valve ball is a cone designated 1, and the soft flexible portion is a hemisphere 2, these portions being connected by an overlapped or beveled seam where the soft portion joins the edge 3 of the comparatively stiff portion.

The surface of this edge 3 is at about a right angle to the inner or outer surface of the cone. This gives a long overlap, making an effective permanent junction. In the views mentioned the upper portion 1 is reinforced adjacent to its apex by an internal thickening 5. This portion surrounds an internally threaded collar 6 which is provided on the exterior with grooves 8 engaging the rubber and securely holding the collar in place when the article is vulcanized. In use, an operating rod is screwed into this threaded collar for raising the ball from its seat.

In making the ball described, I first take a thick disk of raw rubber indicated at R in Fig. 1 and place the same in a conical cavity 13 of a mold member 10. At 12 is a horizontal surface on which the collar 6 may seat and I prefer to position this collar by a short pin 9 threaded into the collar and extending in a manner, not airtight, into an opening in the mold member 10, so that as the rubber is forced into the cavity, air, imprisoned beneath it, may escape around this plug and pin. A coacting mold member 11 is provided with a truncated conical projection 15 whose flattened face 16 leaves the reinforcing rubber at 5. Around this projection is an annular groove 17 into which the rubber is forced forming the edge 3.

The rubber stock formed by the disk R having been placed in the cavity 13, the mold parts 10 and 11 are then brought together causing the rubber to fill the cavity and form the hollow conical member 1, as shown. Any slight surplus of rubber flows outwardly in a narrow fin between the molds and into annular grooves 14 and 18, and such fin may be removed by any convenient means after withdrawing the member 1 from the separated mold parts. The rubber being forced into the grooves 8 and rough surfaces of the collar 6 securely holds it in position so that the pin 9 is still carried by the part 1.

A number of these conical parts may be made in mold members provided with a plurality of cavities and may be semi-cured in such molds, by suitable heat. If it is desired to subject the parts 1 to a still greater degree of vulcanization before joining them to the parts 2, they may be removed from these molds and placed in a vulcanizing chamber for a predetermined period.

The part 1, after being semi-cured, is placed in a mold 20 having a cavity fitting its exterior and provided with an opening for receiving the pin 9 and having a beveled edge 23 surrounding the cavity and projecting above the upper surface of the mold. Then some expanding chemical, such as "ammonia powder," is placed in the part 1, as indicated at A in Fig. 3. Then a sheet of raw rubber, indicated at S, is placed over the upper edges of the stiff parts 1, and a mold member of the character shown at 21 in Fig. 3, and having a cavity 26 surrounded by a cutting edge 24, is brought down into coaction with the mold member 20. In this operation the cutting edge 23 of the mold member 20 coacts with the cutting edge 24 of the mold member 21 to sheer out a disk of the raw rubber and at the same time bend the edges over onto the beveled edge 3 of the member 1 and effectively seal it thereto.

With the two parts of the article sealed together, and the ammonia powder inclosed within the article, the article is transferred to the mold illustrated at 30 and 31 in Fig. 4. This mold closely embraces the part 1 and has a cavity 44 of the shape which the soft rubber part 2 is designed to receive. In this mold the article is heated to a vulcanizing temperature, which causes the ammonia powder to expand the soft rubber section into the form shown in this figure, and properly vulcanizes the part 2 and completes the heat treatment of the part 1. At the end of the vulcanization the molds are separated and the article removed in the finished form shown in Figs. 9 and 10. The pin 9 is then screwed out, leaving the ball ready to be attached.

If the character of rubber used for making the parts 1 and 2 is of the high grade usually required for hollow articles of this sort, the two parts unite without any treatment of the uniting edges. However, in case the quality of rubber is such that they do not readily unite, it is only necessary to slightly roughen the edge 3 of the part 1 by buffing, or to apply cement thereto, to secure a good joint. The part 1 being semi-cured and comparatively hard effectively forms a seat for the soft raw rubber part 2 when they are brought together. Thus I provide an overlapping joint on the parts by merely forming a right angled edge on the part 1, as above described.

It will be seen that by my process the semi-cured portion 1 receives more curing than the soft rubber part 2. This additional curing however, has the effect of completing the curing of part 1 and rendering it comparatively firm to insure the part 1 being sufficiently stiff after these two periods of curing. I may select the rubber for the part 1 with a view to having it hardened more quickly and firmly than part 2. It is to be understood however, that in securing the desired result, one of the important features of my invention is that of semi-curing one part, uniting it to the other raw rubber part, and then completing the curing of both parts simultaneously.

In making the valve ball of the type illustrated in Figs. 11, 12 and 13, and the ball illustrated in Fig. 15, which have butt seams, I proceed along the same lines as already described, but use differently shaped molds to provide for the seam and produce the desired outside bead. Thus the molds shown in Figs. 5 and 6 are very similar to the molds of Figs. 1 and 2, but the member 50 has an annular edge groove 53 to provide an outer bead $3^a$ for the semi-cured portion, and the conical projection 52 of the member 51 is preferably at a less acute angle than the conical cavity of the member 50. Accordingly these members when brought together on a piece of rubber stock R produce a conical member such as shown at 1ª in Figs. 6 and 13. As will be seen the wall in this case is not of constant thickness, but becomes thinner toward the open end of the member.

The semi-cured stiff portions 1ª are now placed in the conical cavities of the mold member 60; some heat-expanding chemical A is inserted; and a sheet of raw rubber is placed over the conical members and mold member 61 brought down into place, with the result that the cutting edges 63 and 64 shear off the rubber and form the member 2ª and the external bead 4ª thereof. This article is then transferred to the vulcanizing mold designated 70 and 71 and thereafter heated with the expanding chemical, forcing the soft rubber part into the hemispherical cavity shown in that figure. In this way the valve ball shown in Figs. 11 and 12 is produced.

The valve ball shown in Fig. 15 has the soft hemi-spherical portion 2ª, the butt seam, and the external bead 4ª 3ª, all similar to that just described, but the semi-cured portion 1ᵇ is not of a conical form but approximately hemispherical with a protuberance 1ᶜ to house the internally threaded collar.

It is sometimes desirable to provide a veneer of soft rubber on the exterior of the semi-cured comparatively stiff portion of the article. This enables a very cheap grade of rubber to be used where only stiffness is necessary, the non-porous and elastic surface characteristics being furnished by a thin veneer. In some instances this may make both a better and cheaper article.

A valve ball embodying the veneer feature is shown in Fig. 16, wherein the main body of the conical portion is designated 1ᵈ and the soft rubber veneer 1ᵉ. These two parts nest together and terminate in the same conical surface 3 which forms the bevel seam for the hemispherical section 2. In making a valve ball of this type the section 1ᵈ is formed just as shown in Figs. 1 and 2 hereof except that its wall is somewhat thinner. After it is formed a disk of thin soft rubber is placed about the semi-cured section, the pin 9 projecting through a hole in the disk and the disk being crowded by hand or mechanism into approximate contact with the exterior of the semi-cured cone. Then such veneered part is placed in the mold shown in Fig. 3 and thereafter treated just as the part 1 in that figure.

From the foregoing description it will be seen that I have devised a new article of manufacture in the nature of a hollow rubber article of various forms but having at least two wall portions, vulcanized to different degrees of hardness, and that I have also provided a novel process for making such an article. Among the advantages of such process are economy in the time required to manufacture the article and in the amount and grade of material used; the seam may be beveled or butted as desired, and an effective junction is accomplished; veneer may be employed if desired and each part is given the desired amount of vulcanizing heat, simply and cheaply. While I have shown but a single cavity in each mold member, it is to be understood that ordinarily mold plates will be employed each having a large number of cavities. In this way a very rapid and cheap production is accomplished.

The present invention is concerned with the process of making hollow rubber articles, including those of the form shown in the drawings. The articles shown, whether made by this process or some other process, are claimed in my copending application No. 250,781, filed August 21, 1918. Attention should also be called to my copending application No. 190,383 filed September 8, 1917, wherein there is shown and described a method of making hollow rubber articles having certain characteristics in common with the method of the present invention, and wherein there are claims covering these features when employed in the present invention.

Having thus described my invention, what I claim is:

1. The process of making hollow rubber articles consisting of forming between male and female dies a part adapted to become comparatively stiff when vulcanized, causing another part to abut and adhere to the end of the part first formed the abutting portions being coplanar, thereafter causing said other part to expand to its proper shape, and vulcanizing it in the expanded position.

2. The method of making hollow rubber articles consisting of forming one part by dies, securing an elastic part directly to its end by a joint wherein the joined portions are coplanar, forcing outwardly the elastic part by internal pressure higher than atmospheric pressure, and vulcanizing the combined article.

3. The method of making hollow rubber articles comprising forming one part between male and female dies and partially curing the same, abutting a raw rubber part against the end of the same, the abutting portions being coplanar, expanding the raw rubber part to shape by fluid pressure within the article after the junction of the parts, and curing the united article to a proper degree to complete the raw rubber part.

4. The method of making hollow rubber articles consisting of forming one part by dies, and semi-curing it, forming another part of elastic raw rubber, joining the parts by a seam wherein the meeting edges are coplanar, forcing outwardly the raw rubber part by internal pressure after the article has been joined and while the article is held in a mold member having a cavity to receive the article, and vulcanizing the article while in such mold member.

5. The process for making a hollow rubber article consisting of forming one wall portion by pressing a raw rubber piece into mold cavities and then partially curing said piece, placing same in another mold provided with an annular cutting edge, placing a heat-expanding substance in position to be within the completed article, placing a raw rubber sheet between the formed portion and a mold member having an annular cutting edge, then bringing the mold parts together to cause the portions to directly engage and unite and at the same time sever the raw rubber portion from its surrounding sheet, and thereafter vulcanizing the entire article at one time.

6. The method of making hollow rubber articles of the character described, comprising forming a portion with a conical edge and semi-curing the same, forming and uniting to such edge a raw rubber portion, a heat-expanding substance being placed within the article, and subjecting the united portions to vulcanizing temperature to harden the semi-cured portion and cure the other portion but leave it flexible.

7. The method of making a hollow rubber article consisting of cutting a raw rubber slug, pressing it into the desired shape and at the same time finishing its edge in a beveled form and partially curing it, providing an unformed sheet part of raw rubber and causing the uniting of the edges of the parts by external pressure and then curing the united parts while expanding the raw rubber part by internal pressure to cause it to have a different contour from that which it had when united.

8. The method of making a composite rubber article comprising semi-curing one part, placing in contact with its surface a veneer of uncured rubber, bringing another piece of uncured rubber into direct coplanar edge contact with both the semi-cured part and the veneer, and vulcanizing the three parts mentioned together.

9. The method of making a hollow rubber article consisting of semi-curing one part, surrounding such part with a veneer of uncured rubber, placing such veneered body in a mold, bringing another piece of uncured rubber into direct edge contact with the entire exposed edge of both the semi-cured body and the veneer embracing it, and vulcanizing the three parts together.

10. A method of making a flush tank bulb, consisting of forming the body of an upper section between male and female dies, partially curing it, applying a veneer of raw rubber to the outer side thereof, applying raw rubber for a lower section which extends across and directly engages the entire end of both the partially cured body and the veneer, and is pressed into tight contact therewith and thereafter vulcanizing the article as a whole.

11. The method of making flush tank bulbs and similar articles, consisting of forming and partially curing a body portion of the upper section having its lower end cut off at an angle to the plane of the bottom thereof, surrounding said partially cured portion by a veneer, forcing the partially cured portion and the veneer into intimate contact with a raw rubber lower section which extends outside of the partially cured section.

12. The method of making a valve ball, comprising forming a conical shaped upper section of raw rubber with a beveled end and partially curing it, surrounding it with a veneer, pressing into edge engagement with the partially cured portion and the veneer raw rubber and simultaneously cutting off such raw rubber in an annular course adjacent to the exterior of the article, whereby said raw rubber is intimately united to both the partially cured portion and the veneer and the surplus of such raw rubber is cut off, and thereafter vulcanizing the article as a unit.

In testimony whereof, I hereunto affix my signature.

FRED THOMAS ROBERTS.